United States Patent
Banerjee et al.

(10) Patent No.: US 10,146,511 B2
(45) Date of Patent: Dec. 4, 2018

(54) SYSTEM AND METHOD FOR ESTIMATING PACKAGE IMPLEMENTATION EFFORT OF SDLC ACTIVITIES

(71) Applicant: Tata Consultancy Services Limited, Mumbai (IN)

(72) Inventors: Rajib Banerjee, Kolkata (IN); Suranjan Chatterjee, Kolkata (IN); Arnab De, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 215 days.

(21) Appl. No.: 14/955,714

(22) Filed: Dec. 1, 2015

(65) Prior Publication Data
US 2017/0153873 A1    Jun. 1, 2017

(51) Int. Cl.
*G06F 8/20* (2018.01)
*G06Q 10/06* (2012.01)

(52) U.S. Cl.
CPC ........... *G06F 8/20* (2013.01); *G06Q 10/0631* (2013.01); *G06Q 10/06311* (2013.01); *G06Q 10/06312* (2013.01)

(58) Field of Classification Search
CPC .................. G06F 8/20; G06Q 10/0631; G06Q 10/06311; G06Q 10/06312
See application file for complete search history.

(56) References Cited

U.S. PATENT DOCUMENTS

| | | | |
|---|---|---|---|
| 5,815,638 A * | 9/1998 | Lenz .................. | G06F 8/20 706/15 |
| 2004/0243457 A1* | 12/2004 | D'Andrea ............. | G06Q 10/06 705/7.23 |
| 2011/0066887 A1* | 3/2011 | Bassin ................ | G06F 11/3672 714/27 |
| 2013/0167107 A1 | 6/2013 | Goyal et al. | |
| 2014/0089887 A1 | 3/2014 | Bhattacharyya et al. | |
| 2014/0188562 A1* | 7/2014 | Koliyoor ............ | G06Q 30/0206 705/7.32 |
| 2015/0121332 A1 | 4/2015 | Bhattacharyya et al. | |

* cited by examiner

*Primary Examiner* — S. Sough
*Assistant Examiner* — Timothy P Duncan
(74) *Attorney, Agent, or Firm* — Finnegan, Henderson, Farabow, Garrett & Dunner LLP

(57) ABSTRACT

System and method for estimating package implementation effort of software development life cycle (SDLC) activities are disclosed. In an embodiment, information associated with a plurality of configuration parameters of a SDLC activity is obtained. The configuration parameters include an organization, an industry vertical, business criticality of functionalities within the industry vertical, influencing factors and a utilization factor. Further, one or more of configuration factors associated with the SDLC activity are determined based on the information associated with the configuration parameters. Furthermore, functional effort for configuration of the SDLC activity is estimated based on the configuration factors. In addition, information associated with a plurality of customization parameters of the SDLC activity is obtained. Moreover, customization effort for customization of the SDLC activity is estimated based on the information associated with the customization parameters. Also, package implementation effort of the SDLC activity is estimated using the functional effort and customization effort.

14 Claims, 7 Drawing Sheets

INPUTS FOR ORGANIZATION NAME AND RELATED INDUSTRY VERTICAL
ORGANIZATION
(Enter)
Industry Vertical
(Please choose from the LOV)
Financial Services
FIG. 3A  — 300A

PACKAGE IMPLEMENTATION EFFORT

Industry Vertical: Financial Services
Company Name: ABC

| Item | Effort Estimates in Person Month (Standard) | Effort Estimates in Person Month (Aggressive) |
|---|---|---|
| Practical Effort | 17.2 | 13.2 |
| Communication Effort | 20.3 | 15.2 |
| Organization Effort | 68.0 | 48.0 |
| Project Management | 10.0 | 7.0 |
| QA Adjusted Effort | 18.3 | 13.3 |
| Quality Adjusted | 9.0 | 6.5 |
| Total Factors Adjusted | 71.0 | 66.0 |
| Total Factors Adjusted | 18.0 | 13.0 |
| Final Effort | 19.1 | 10.1 |

FIG. 3E — 300E

SYSTEM AND METHOD FOR ESTIMATING PACKAGE IMPLEMENTATION EFFORT OF SDLC ACTIVITIES

TECHNICAL FIELD

The embodiments herein generally relate to software development lifecycle (SDLC) activities, and, more particularly, to estimate package implementation effort of the SDLC activities.

BACKGROUND

Generally, the package implementation effort estimation is a total workload estimation or effort estimation in person months to execute given implementation or reimplementation software development lifecycle (SDLC) activities. However, the package implementation effort estimation is an experience-driven exercise with heuristic mindset and lacks uniform industry level framework. Further, multiple variable inputs and influencing factors which change from industry-to-industry and/or organization-to-organization, may make the estimation complex and difficult to standardize. Multiple skills may be required to perform the estimation exercise which becomes a challenge to gather and consolidate on same ground. Thus, the estimation may be dependent on estimator's exposure to business or SDLC activity which is reflected in the outcome. In such scenarios, one runs the risk of under or over estimation that can have a damaging effect on the SDLC activities losing profitability. Also, there can be ripple effects in terms of customer perceptions.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below. In view of the foregoing, an embodiment herein provides a system and method for estimating package implementation effort of software development lifecycle (SDLC) activities.

In one aspect, a method for estimating package implementation effort of SDLC activities is disclosed. In an embodiment, information associated with a plurality of configuration parameters of a SDLC activity is obtained, For example, the configuration parameters include an organization, an industry vertical, business criticality of a plurality of functionalities within the industry vertical, a utilization factor and influencing factors of the organization. Further, one or more of configuration factors associated with the SDLC activity are determined based on information associated with one or more of the configuration parameters. For example, the configuration factors include a functionality factor, a volume factor, a base effort factor, and a productivity adjustment factor. Furthermore, functional effort for configuration of the SDLC activity is estimated based on the determined configuration factors. In addition, information associated with a plurality of customization parameters of the SDLC activity is obtained. Moreover, customization effort for customization of the SDLC activity is estimated based on the information associated with the customization parameters. Also, package implementation effort of the SDLC activity is estimated using the functional effort and the customization effort.

In another aspect, a system for estimating package implementation effort of SDLC activities is disclosed. In an embodiment, the system includes one or more processor(s) and a memory communicatively coupled to the processor(s). Further, the memory includes an effort estimation module. In this embodiment, the effort estimation module obtains information associated with a plurality of configuration parameters of a SDLC activity. For example, the configuration parameters include an organization, an industry vertical, business criticality of a plurality of functionalities within the industry vertical, a utilization factor and influencing factors of the organization. Further, the effort estimation module determines one or more of configuration factors associated with the SDLC activity based on the information associated with one or more of the configuration parameters. For example, the configuration factors include a functionality factor, a volume factor, a base effort factor, and a productivity adjustment factor. Furthermore, the effort estimation module estimates functional effort for configuration of the SDLC activity based on the determined configuration factors. In addition, the effort estimation module obtains information associated with a plurality of customization parameters of the SDLC activity. Moreover, the effort estimation module estimates customization effort for customization of the SDLC activity based on the information associated with the customization parameters. Also, the effort estimation module estimates package implementation effort of the SDLC activity using the functional effort and the customization effort.

In yet another aspect, a non-transitory computer readable storage medium includes a program code with instructions for estimating package implementation effort of SDLC activities is disclosed. In an embodiment, the instructions include instructions to obtain information associated with a plurality of configuration parameters of a SDLC activity. For example, the configuration parameters include an organization, an industry vertical, business criticality of a plurality of functionalities within the industry vertical, a utilization factor and influencing factors of the organization. Further, the instructions include instructions to determine one or more of configuration factors associated with the SDLC activity based on the information associated with one or more of the configuration parameters. For example, the configuration factors include a functionality factor, a volume factor, a base effort factor, and a productivity adjustment factor. Furthermore, the instructions include instructions to estimate functional effort for configuration of the SDLC activity based on the determined configuration factors. In addition, the instructions include instructions to obtain information associated with a plurality of customization parameters of the SDLC activity. Moreover, the instructions include instructions to estimate customization effort for customization of the SDLC activity based on the information associated with the customization parameters. Also, the instructions include instructions to estimate package implementation effort of the SDLC activity using the functional effort and the customization effort.

It should be appreciated by those skilled in the art that any block diagram herein represent conceptual views of illustrative systems embodying the principles of the present subject matter. Similarly, it is appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein are better understood from the following detailed description with reference to the drawings, in which:

FIGS. 3A-3D are screenshots illustrating information associated with one or more of configuration parameters and customization parameters of a SDLC activity, according to an embodiment of the present disclosure; and FIG. 3E is a screenshot illustrating package implementation effort of the SDLC activity, according to an embodiment of the present disclosure.

DETAILED DESCRIPTION

Figure 1:
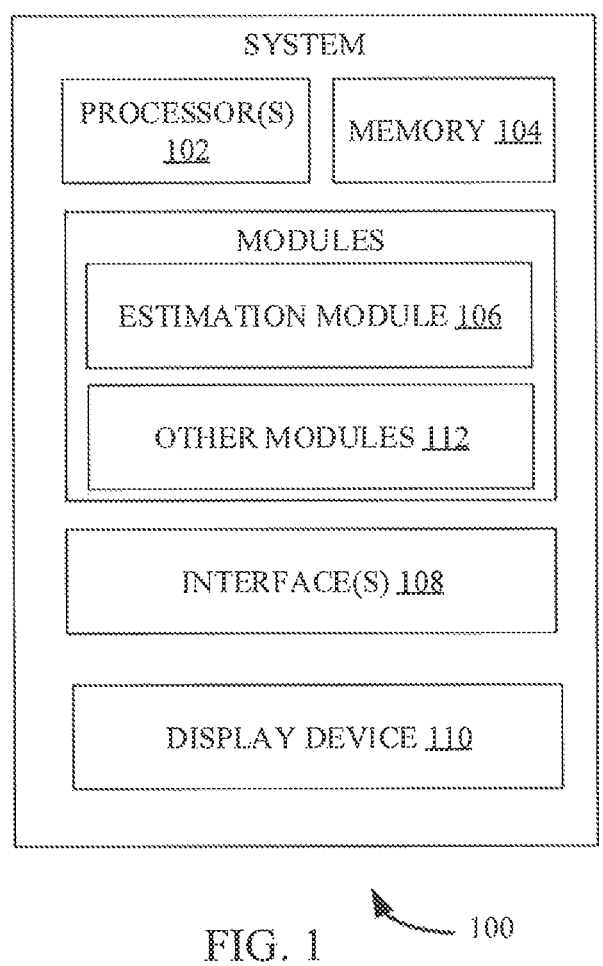
FIG. 1 illustrates a system for estimating package implementation effort of software development life cycle (SDLC) activities, according to an embodiment of the present disclosure.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The present disclosure provides a system and method for estimating package implementation effort of software development life cycle (SDLC) activities. The present disclosure provides various embodiments to estimate package implementation effort of the SDLC activities in person months depending on functional (product configuration) effort and customization effort for the SDLC activities. In an embodiment, the present disclosure estimates functional effort based on parameters, such as an industry vertical, a functionality factor, a volume factor and the like. For example, the volume factor include various categories, each with list of influencing actors and their specified complexity guidelines. The parameters are specific to implementing organization. In an example embodiment, user is allowed to provide an input for the organization and select the corresponding industry vertical. Further, a list of functionalities are displayed to the user. For example, built-in specific functionalities and a list of industry segments/verticals are developed using an innovative empirical computational approach based on numerous historical project data. With the help of the fitment scale and criticality, a computed and derived value is obtained. In an example, a standard approach of listing criticality of functionalities pertaining to a specific industry vertical selected is based on historical field data. Furthermore, the user is allowed to provide an input in standard score on a scale of 0 to 5 for each volume factor. In addition, the user is allowed to enter the volume factor of specific functionality based on people, tool, process, and the like. Further, the user is allowed to enter business criticality of a specific functionality, which are self-explanatory in nature and have a defined fitment scale to be computed. User inputs are kept simple and minimal, appropriate tips to aid an estimator and lucid descriptions for quick reference. These parameters derived are put through empirical formulae to estimate the functional effort.

Furthermore, the present disclosure estimates the customization effort based on reports, interfaces, conversions, extensions and enhancements and workflows and their complexity percentage distribution. The defined fields specify a list of custom component categories which might be developed as a part of implementation. User provides a number for each component type and specifies complexity distribution for each of the component types. The customization effort may include analysis, design, development and testing effort.

Moreover, the present disclosure estimates the package implementation effort of the SDLC activities by adding the functional effort and the customization effort. In an example embodiment, a size-index derived from the volume factor is used as a multiplier coefficient to compute the package implementation effort. In some embodiments, the present disclosure estimates the package implementation effort based on period adjustment factor incase specific increased duration for SDLC activity execution is specified by a customer. Also, the present disclosure determines adjusted total effort by summing up the package implementation effort, project management effort, quality assurance effort and database administration effort.

FIG. 1 illustrates a system 100 for estimating package implementation effort of SDLC activities, according to an embodiment of the present disclosure. As shown in FIG. 1 the system 100 includes one or more processor(s) 102 and a memory 104 communicatively coupled to each other. The system 100 also includes interface(s) 108 and a display device 110. Further, the memory 104 includes modules, such as an effort estimation module 106 and other modules 112. Although FIG. 1 shows example components of the system 100, in other implementations, the system 100 may contain fewer components, additional components, different components, or differently arranged components than depicted in FIG. 1.

The processor(s) 102 and the memory 104 may be communicatively coupled by a system bus. The processor(s) 102 may include circuitry implementing, among others, audio and logic functions associated with the communication. The processor 102 may include, among other things, a clock, an arithmetic logic unit (ALU) and logic gates configured to support operation of the processor(s) 102. The processor(s) 102 can be a single processing unit or a number of units, all of which include multiple computing units. The processor(s) 102 may be implemented as one or more microprocessors, microcomputers, microcontrollers, digital signal processors, central processing units, state machines, logic circuitries, and/or any devices that manipulate signals based on operational instructions. Among other capabilities, the processor(s) 102 is configured to fetch and execute computer-readable instructions and data stored in the memory 104.

The functions of the various elements shown in the system 100, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional, and/or custom, may also be included.

The interface(s) 108 may include a variety of software and hardware interfaces, for example, interfaces for peripheral device(s), such as a keyboard, a mouse, an external memory, and a printer. The interface(s) 108 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 108 may include one or more ports for connecting the system 100 to other devices.

The memory 104 may include any computer-readable medium known in the art including, for example, volatile memory, such as static random access memory (SRAM) and dynamic random access memory (PRAM), and/or non-volatile memory, such as read only memory (ROM), erasable programmable ROM, flash memories, hard disks, optical disks, and magnetic tapes. The memory 104, may store any number of pieces of information, and data, used by the system 100 to implement the functions of the system 100. The memory 104 may be configured to store information, data, applications, instructions or the like for enabling the system 100 to carry out various functions in accordance with various example embodiments. Additionally or alternatively, the memory 104 may be configured to store instructions which when executed by the processor 102 causes the system 100 to behave in a manner as described in various embodiments. The memory 104 includes the effort estimation module 106 and other modules 112. The module 106 and other modules 112 include routines, programs, objects, components, data structures, etc., Which perform particular tasks or implement particular abstract data types. The other modules may include programs or coded instructions that supplement applications and functions of the system 100.

In an embodiment, the effort estimation module 106 obtains information associated with a plurality of configuration parameters of a SDLC activity. For example, the configuration parameters include an organization, an industry vertical, business criticality of a plurality of functionalities within the industry vertical, influencing factors of the organization, a utilization factor (UF) and the like. For example, the influencing factors include a population density in the industry vertical, a technology, a business process, a period adjustment factor and so on. In this example, the period adjustment factor is indicative of an extended duration for executing the SDLC activity. For example, a standard duration considered for a SDLC activity execution is around 9 to 10 months, for the estimates. If a customer has specifically suggested a duration for the SDLC activity, the user needs to provide the customer requested duration in the volume factor tab under the header 'period influence' with the appropriate standard score. Based on the standard score selected for this parameter the output field "period adjustment factor" is displayed with a specific value. In this example, the information is obtained from request for proposal (RFP) or request for information (RFI) documents, pre-bid notes and clarifications, as well as ground intelligence gathered by the sales or presales team of a service provider. The effort estimation module 106 provides an interface (e.g., a user interface) with minimum data entry on the display device 110, and provides suitable help on field-descriptions, definitions of the input scale and possible default values.

In an example implementation, the effort estimation module 106 obtains the information associated with the organization, the industry vertical within the organization and the utilization factor via the interface displayed to a user on the display device 110. For example, the information includes a name of the organization and a name of the industry vertical within the organization where the SDLC activity is being executed. Further, the effort estimation module 106 extracts the plurality of functionalities available within the industry vertical at the interface on the display device 110 based on the information associated with the industry vertical. In other words, the effort estimation module 106 displays the plurality of functionalities available within the industry vertical at the interface on the display device 110. Furthermore, the effort estimation module 106 obtains the information associated with the business criticality of the plurality of functionalities from the user via the interface on the display device 110. For example, the information associated with the business criticality of the plurality of functionalities includes descriptive text associated with each of the plurality of functionalities. In addition, the effort estimation module 106 computes a score on a fitment scale for each of the plurality of functionalities based on the information associated with the business criticality of the plurality of functionalities. The effort estimation module 106 then extracts the influencing factors of the organization at the interface on the display device 110 based on the information associated with the organization. Also, the effort estimation module 106 obtains the information associated with each of the influencing factors from the user via the interface on the display device 110. For example, the information associated with each of the influencing factors include a complexity score for each of the influencing factors. For example, the complexity score is a score (e.g., 1-4) given by a user for an influencing factor based on a level of influence on the SDLC activity.

Further in this embodiment, the effort estimation module 106 determines configuration factors, such as a functionality factor, a volume factor, a base effort factor, productivity adjustment factor associated with the SDLC activity based on the information associated with one or more of the configuration parameters, the score on the fitment scale and/or the complexity score for each of the influencing factors. In an example embodiment, the effort estimation module 106 determines the functionality factor for the functionalities based on the score on the fitment scale of each model and business criticality of each functionality. For example, the functionality factor is determined using a below equation.

$$\text{Functionality factor (FF)} = \Sigma[(1/A \times B)]$$

wherein, A is a fitment Scale of each functionality from a range of 1 to 5 and B is a criticality of each functionality from a range of 1 to 3.

Further in this example embodiment, the effort estimation module 106 determines the base effort factor based on base effort required to implement different applicable functionalities in person months. In a scenario, the base effort actor is determined by considering single organization building, business unit, localization, multilingual, client extensions, workflow creation, customization and so on. In an example scenario, performance test effort for each of a custom component developed is also derived as a factor of the base effort factor. For example, the base effort factor is determined using a below equation:

Base effort factor (BF)=Σ[base Effort to implement different applicable functionalities in person months]

Furthermore in this example embodiment, the effort estimation module 106 determines the volume factor based on one or more of the configuration parameters. For example, the volume factor is a multiplier coefficient derived based on the computed score on the fitment scale for each of the plurality of functionalities and the complexity score for each of the influencing factors. In other words, the volume factor (VF) is a growth function used to calculate the standard score of the volume factor using weighted average computation of complexity of the implementation. In an example, a graph includes X-axis indicating a weighted average computation of the volume factor which indicates the complexity of the implementation and Y-axis indicating the size-index which is derived based on the volume factor through a pre-set graph plotted based on the values taken from multiple SDLC activities. The graph starts with a certain gradient on the lower end which picks up in the middle when moving ahead on the X-axis and finally slows down and flattens out with a low gradient at the higher end of the curve. Thus, indicating at 'low-complexity' range the rate of change in 'size' is lower than the mid-range where a change in complexity impacts size more heavily. Again, beyond a certain point at higher end, complexity change effect on size flattens out.

In addition, the effort estimation module 106 determines the productivity adjustment factor (PF) based on the base effort factor (BF), functionality factor (FF), volume factor (VF) and utilization factor (UF). For example, the productivity adjustment factor (PF) is determined using a below equation:

PF=((BF+(FF*BF))*VF)/UF)−(BF+(FF*BF))*VF

Further in this embodiment, the effort estimation module 106 estimates functional effort for configuration of the SDLC activity based on the determined functionality factor, volume factor, base effort, and productivity adjustment factor. For example, the effort estimation module 106 estimates the functional effort in person months using a below equation:

functional effort=((BF+(FF*BF))*VF)+PF

Furthermore in this embodiment, the effort estimation module 106 obtains information associated with a plurality of customization parameters of the SDLC activity. For example, the customization parameters include reports, conversions, extensions and enhancements, workflows and the like. For example, the information associated with customization parameters includes a total number of each of the customization parameters of the SDLC activity. In other words, the customization effort is determined based on various types of custom components which may need to be developed as a part of the implementation activity. The number of each customization parameter need to be developed as a part of the customization scope is provided as an input. The system 100 is caused to provide complexity distribution for each of the customization parameters. The total effort for all the custom components provides the customization effort which includes the effort for design, development, unit testing, integration testing and performance testing. In addition, the effort estimation module 106 estimates customization effort for customization of the SDLC activity based on the information associated with the customization parameters. In some embodiments, the customization effort estimation can be performed in parallel with the functional effort estimation.

Also, the effort estimation module 106 estimates the package implementation effort of the SDLC activity using the functional effort and the customization effort. For example, the effort estimation module 106 estimates the package implementation effort of the SDLC activity by adding the functional effort and the customization effort. In some embodiments, the effort estimation module 106 obtains information associated with project management effort (i.e., effort required for project management), quality assurance effort (i.e., effort associated with quality assurance) and database administration effort (i.e., effort required for database administration) of the SDLC activity from the user via the interface on the display device 110. Further, the effort estimation module 106 adjusts the estimated package implementation effort of the SDLC activity based on one or more parts of the information associated with project management effort, quality assurance effort and/or database administration effort of the SDLC activity.

Figure 2:
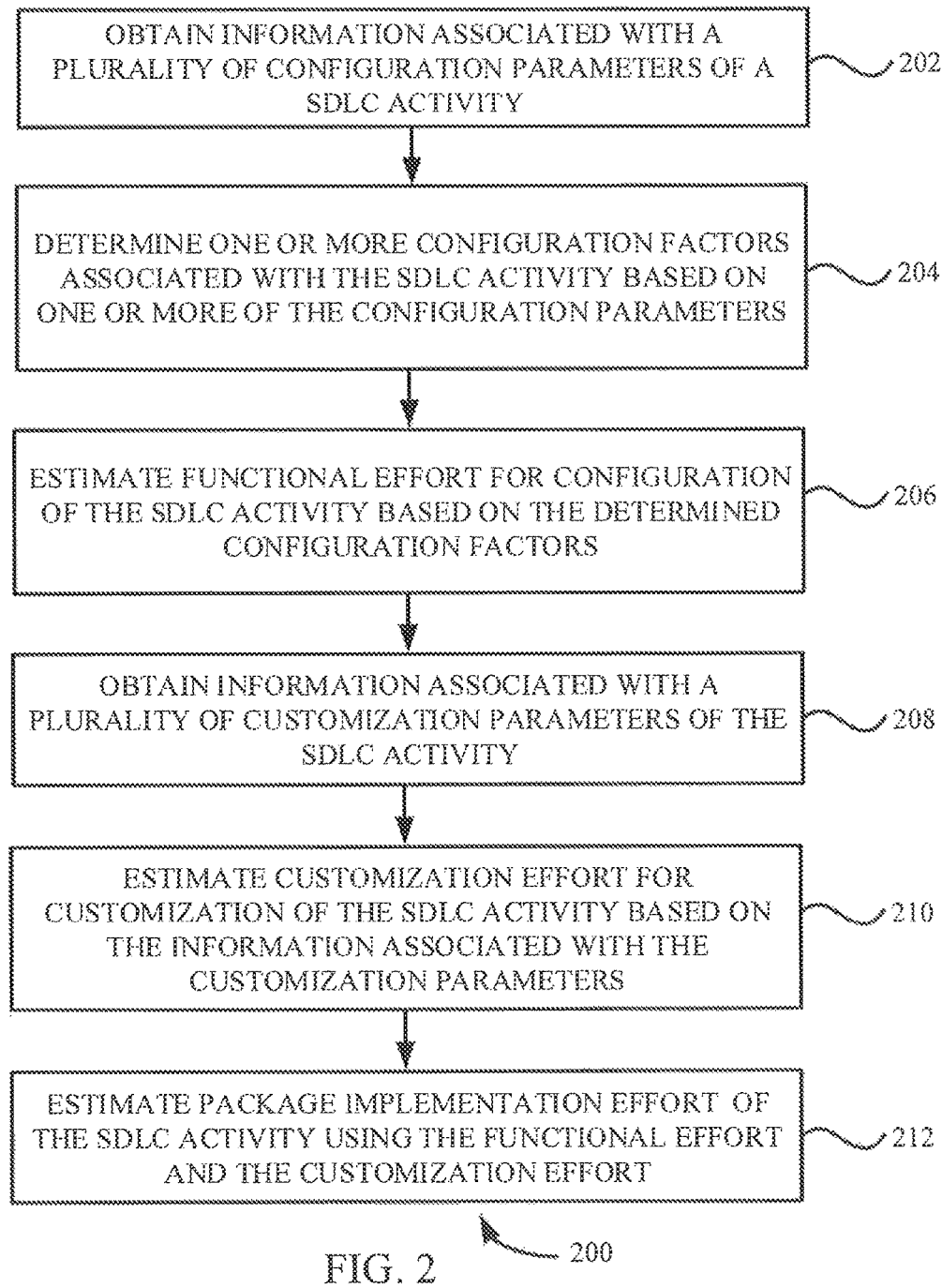
FIG. 2 is a flow chart illustrating a method for estimating package implementation effort of SDLC activities, according to an embodiment of the present disclosure.

FIG. 2 is a flow chart 200 illustrating a method for estimating package implementation effort of SDLC activities, according to an embodiment of the present disclosure. At block 202, information associated with a plurality of configuration parameters of the SDLC activity is obtained. For example, the configuration parameters include an organization, an industry vertical, business criticality of a plurality of functionalities within the industry vertical, a utilization factor, influencing factors of the organization and the like. For example, the influencing factors include a population density in the industry vertical, a technology, a business process, a period adjustment factor and so on. In this example, the period adjustment factor is indicative of an extended duration for executing the SDLC activity.

Figure 3B:
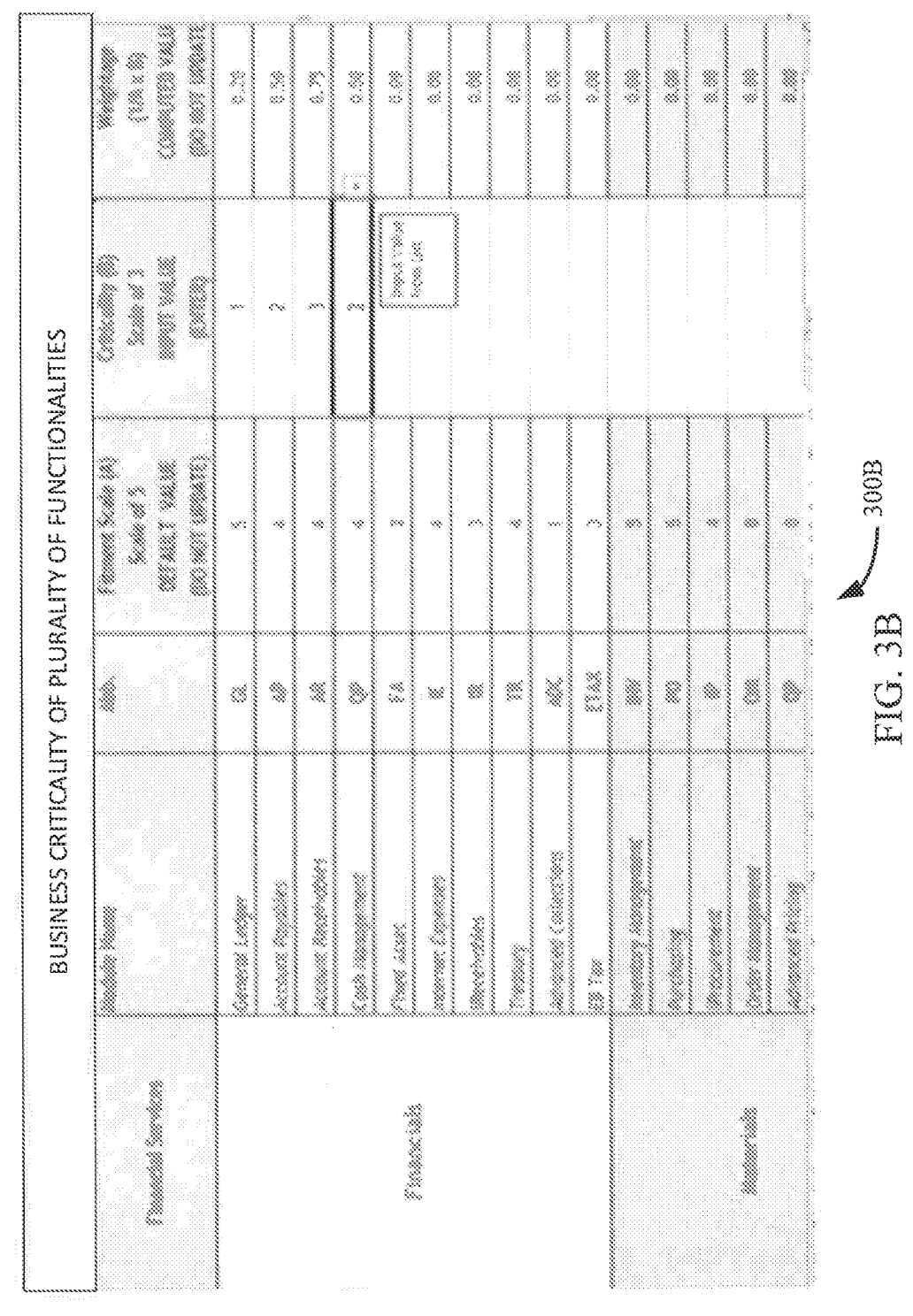
Figure 3C:
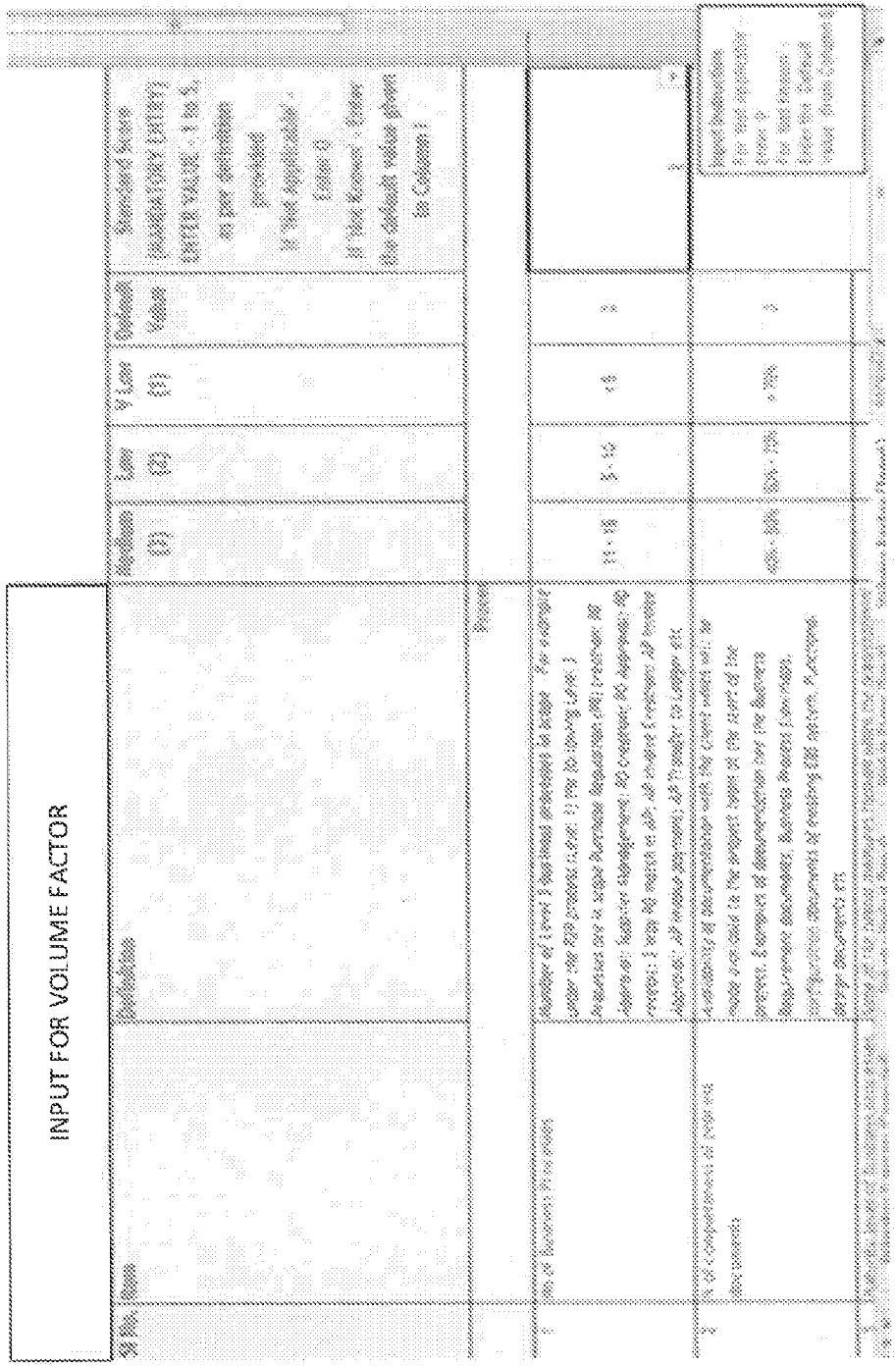

In an example implementation, the information associated with the organization, the industry vertical within the organization and the utilization factor is obtained via an interface displayed to a user (e.g., as shown in a screenshot 300A of FIG. 3A). For example, the information includes a name of the organization and/or a name of the industry vertical within the organization where the SDLC activity is being executed. Further, the plurality of functionalities available within the industry vertical are extracted at the interface based on the information associated with the industry vertical. Furthermore, the information associated with the business criticality of the plurality of functionalities is obtained from the user via the interface (e.g., as shown in a screenshot 300B of FIG. 3B). For example, the information associated with the business criticality of the plurality of functionalities includes descriptive text associated with each of the plurality of functionalities. Also, a score on a fitment scale for each of the plurality of functionalities is computed based on the information associated with the business criticality of the plurality of functionalities. In addition, the influencing factors of the organization are extracted at the interface based on the information associated with the organization. Moreover, the information associated with each of the influencing factors is obtained from the user via the interface (e.g., as shown in a screenshot 300C of FIG. 3C). For example, the information associated with each of the influencing factors include a complexity score for each of the influencing factors.

At block 204, one or more of configuration factors, such as a functionality factor, a volume factor, a base effort factor, and a productivity adjustment factor associated with the SDLC activity are determined based on information associated with the one or more of the configuration parameters. For example, the volume factor which is a multiplier coefficient is determined or derived based on the computed score on the fitment scale for each of the plurality of functionalities and the complexity score for each of the influencing factors.

Figure 3D:
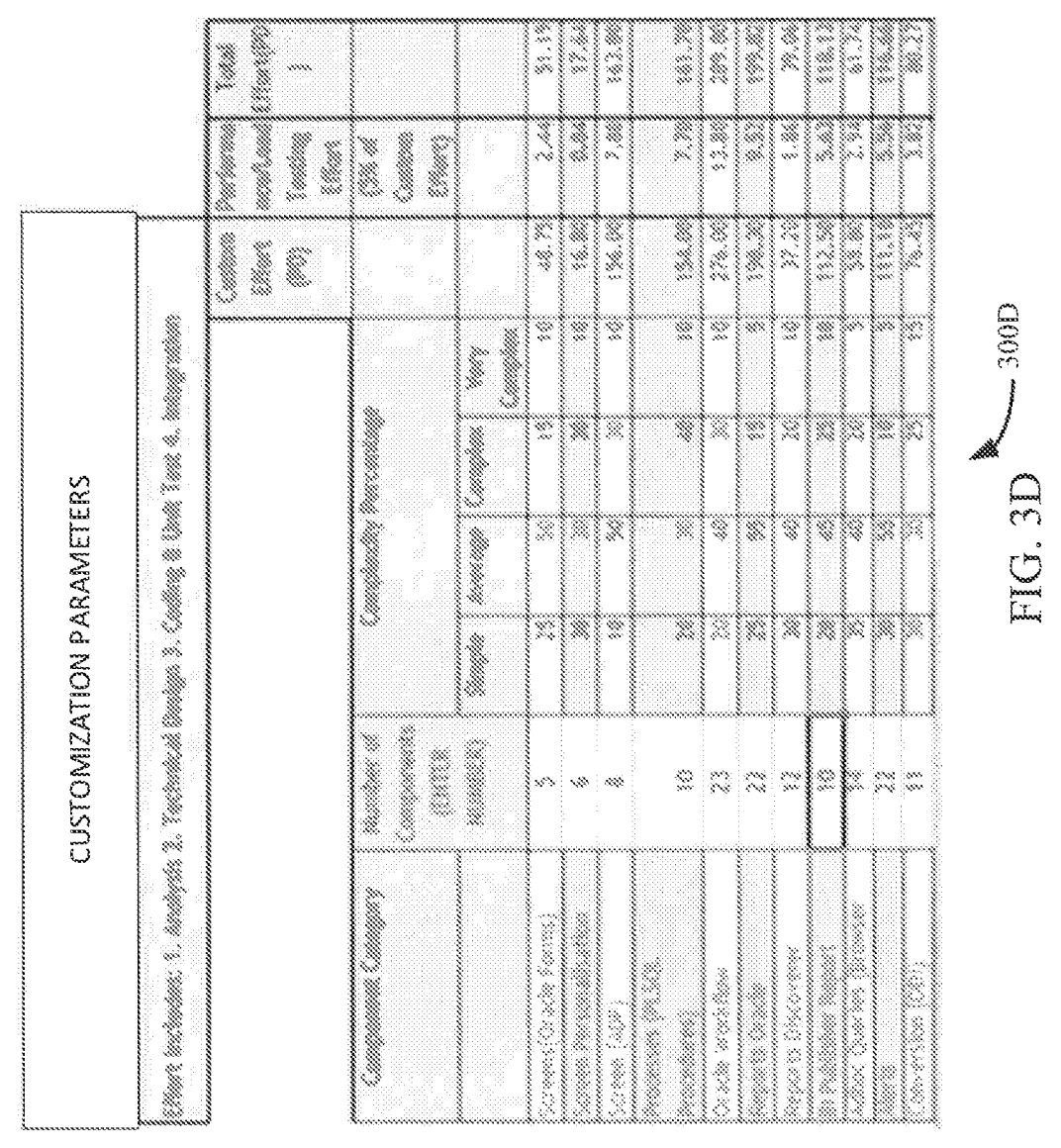

At block 206, functional effort for configuration of the SDLC activity is estimated based on the determined functionality factor, volume factor, base effort factor, productivity adjustment factor. At block 208, information associated with a plurality of customization parameters of the SDLC activity is obtained via an interface (e.g., as shown in a screenshot 300D of FIG. 3D). For example, the customization parameters include reports, conversions, extensions and enhancements, workflows and so on. For example, the information associated with customization parameters of the SDLC activity includes a total number of each of the customization parameters of the SDLC activity. At block 210, customization effort for customization of the SDLC activity is estimated based on the information associated with the customization parameters.

At block 212, the package implementation effort of the SDLC activity is estimated by adding the functional effort and the customization effort. In some embodiments, information associated with project management effort, quality assurance effort and database administration effort of the SDLC activity is obtained. Further, the estimated package implementation effort of the SDLC activity is adjusted based on the information associated with project management effort, quality assurance effort and/or database administration effort of the SDLC activity (e.g., as shown in a screenshot 300E of FIG. 3E). This is explained in more detailed with reference to FIG. 1.

The order in which the method(s) are described is not intended to be construed as a limitation, and any number of the described method blocks can be combined in any order to implement the method 200, or an alternative method. Additionally, individual blocks may be deleted from the methods without departing from the spirit and scope of the subject matter described herein. Furthermore, the method 200 can be implemented in any suitable hardware, software, firmware, or combination thereof.

In an implementation, one or more of the method(s) described herein may be implemented at least in part as instructions embodied in non-transitory computer-readable storage medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media.

In various embodiments of FIGS. 1 and 3E, an underlying estimation technique which is a layered framework based on as industry relevance of the product, functionality fitment of business requirements and influencing factors specific to the implementing organization is disclosed. All the components derived from the layered framework are put through empirical formulas to derive the final effort of implementation using statistical computing techniques. Based on the package implementation effort estimation, various implementation tasks are distributed across the overall elapsed time of the SDLC activities. Thereafter, full time equivalent skills and respective manpower-count gets allocated across the tasks based on multiple parameters, to arrive at a resource distribution matrix covering the entire SDLC activities schedule. In this technique, user inputs are kept simple and minimal, appropriate tips available to aid an estimator or user, lucid descriptions visible for a quick reference during data entry. Further, this technique is performed dynamically at any stage of the SDLC activity as and when there are changes or updates in one or more of configuration parameters and/or customization parameters.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device.

The preceding description has been presented with reference to various embodiments. Persons having ordinary skill in the art and technology to which this application pertains appreciate that alterations and changes in the described structures and methods of operation can be practiced without meaningfully departing from the principle, spirit and scope.

What is claimed is:

1. A computer implemented method for estimating package implementation effort of a software development life cycle (SDLC) activity, the method comprising:

obtaining, by a processor, information associated with a plurality of configuration parameters of the SDLC activity, wherein the plurality of configuration parameters comprise an organization, an industry vertical within the organization, business criticality of a plurality of functionalities within the industry vertical, a utilization factor and influencing factors of the organization;

determining, by the processor, configuration factors associated with the SDLC activity based on the information associated with at least one of the plurality of configuration parameters, wherein the configuration factors comprise a functionality factor, a volume factor, a base effort factor, and a productivity adjustment factor, wherein the functionality factor is determined based on a score of each of the plurality of functionalities in the SDLC activity and the business criticality of the plurality of functionalities, wherein the score of each of the plurality of functionalities in the SDLC activity is dynamically determined based on the business criticality of the plurality of functionalities, wherein the volume factor is derived based on the score for each of the plurality of functionalities and a complexity score for each of the influencing factors, wherein the base effort factor is determined based on base effort required to implement the plurality of functionalities in person months and wherein the productivity adjustment factor is determined based on the functionality factor, the volume factor, and the base effort factor;

estimating, by the processor, functional effort for configuration of the SDLC activity based on the determined configuration factors;

obtaining, by the processor, information associated with a plurality of customization parameters of the SDLC activity, wherein the plurality of customization parameters comprise reports, conversions, extensions, enhancements and workflows associated with the SDLC activity and wherein the information associated with the plurality of customization parameters comprise a number of each of the plurality of customization parameters and complexity distribution of each of the plurality of customization parameters;

estimating, by the processor, customization effort for customization of the SDLC activity based on the information associated with the plurality of customization parameters;

dynamically, by the processor, deriving a size-index from the volume factor; and estimating, by the processor, the package implementation effort of the SDLC activity using the functional effort, the customization effort and the size-index as a multiplier coefficient.

2. The method of claim 1, further comprising:

obtaining, by the processor, information associated with project management effort, quality assurance effort and database administration effort of the SDLC activity; and adjusting, by the processor, the estimated package implementation effort of the SDLC activity based on at least a part of the information associated with project management effort, quality assurance effort and database administration effort of the SDLC activity.

3. The method of claim 1, wherein obtaining the information associated with the plurality of configuration parameters of the SDLC activity comprises:

obtaining the information associated with the organization, the industry vertical within the organization and the utilization factor via an interface, wherein the information comprises a name of the organization and a name of the industry vertical within the organization where the SDLC activity is being executed;

extracting the plurality of functionalities available within the industry vertical at the interface based on the information associated with the industry vertical;

obtaining the information associated with the business criticality of the plurality of functionalities via the interface, wherein the information associated with the business criticality of the plurality of functionalities comprises descriptive text associated with each of the plurality of functionalities;

extracting the influencing factors of the organization at the interface based on the information associated with the organization; and obtaining the information associated with each of the influencing factors via the interface, wherein the information associated with each of the influencing factors comprise the complexity score for each of the influencing factors.

4. The method of claim 3, further comprising:

computing, by the processor, the score on a fitment scale for each of the plurality of functionalities based on the information associated with the business criticality of the plurality of functionalities.

5. The method of claim 1, wherein the influencing factors comprise a population density in the industry vertical, a technology, a business process and a period adjustment factor.

6. The method of claim 5, wherein the period adjustment factor is indicative of an extended duration for executing the SDLC activity.

7. A system for estimating package implementation effort of a software development life cycle (SDLC) activity, the system comprising:

at least one processor; and a memory communicatively coupled to the at least one processor, wherein the memory comprises an effort estimation module to:

obtain information associated with a plurality of configuration parameters of the SDLC activity, wherein the plurality of configuration parameters comprise an organization, an industry vertical within the organization, business criticality of a plurality of functionalities within the industry vertical, a utilization factor and influencing factors of the organization;

determine configuration factors associated with the SDLC activity based on the information associated with at least one of the plurality of configuration parameters, wherein the configuration factors comprise a functionality factor, a volume factor, a base effort factor, and a productivity adjustment factor, wherein the functionality factor is determined based on a score of each of the plurality of functionalities in the SDLC activity and the business criticality of the plurality of functionalities, wherein the score of each of the plurality of functionalities in the SDLC activity is dynamically determined based on the business criticality of the plurality of functionalities, wherein the volume factor is derived based on the score for each of the plurality of functionalities and a complexity score for each of the influencing factors, wherein the base effort factor is determined based on base effort required to implement the plurality of functionalities in person months and wherein the productivity adjustment factor is determined based on the functionality factor, the volume factor, and the base effort factor;

estimate functional effort for configuration of the SDLC activity based on the determined configuration factors;

obtain information associated with a plurality of customization parameters of the SDLC activity, wherein the plurality of customization parameters comprise reports, conversions, extensions, enhancements and workflows associated with the SDLC activity and wherein the information associated with the plurality of customization parameters comprise a number of each of the plurality of customization parameters and complexity distribution of each of the plurality of customization parameters;

estimate customization effort for customization of the SDLC activity based on the information associated with the plurality of customization parameters;

dynamically derive a size-index from the volume factor; and estimate the package implementation effort of the SDLC activity using the functional effort, the customization effort and the size-index as a multiplier coefficient.

8. The system of claim 7, wherein the effort estimation module is further configured to:

obtain information associated with project management effort, quality assurance effort and database administration effort of the SDLC activity; and adjust the estimated package implementation effort of the SDLC activity based on at least a part of the information associated with project management effort, quality assurance effort and database administration effort of the SDLC activity.

9. The system of claim 7, wherein the effort estimation module is configured to:

obtain the information associated with the organization, the industry vertical within the organization and the utilization factor via an interface, wherein the information comprises a name of the organization and a name of the industry vertical within the organization where the SDLC activity is being executed;

extract the plurality of functionalities available within the industry vertical at the interface based on the information associated with the industry vertical;

obtain the information associated with the business criticality of the plurality of functionalities via the interface, wherein the information associated with the business criticality of the plurality functionalities comprises descriptive text associated with each of the plurality of functionalities;

extract the influencing factors of the organization at the interface based on the information associated with the organization; and obtain the information associated with each of the influencing factors via the interface, wherein the information associated with each of the influencing factors comprise a the complexity score for each of the influencing factors.

10. The system of claim 9, wherein the effort estimation module is configured to:

compute the score on a fitment scale for each of the plurality of functionalities based on the information associated with the business criticality of the plurality of functionalities.

11. The system of claim 7, wherein the influencing factors comprise a population density in the industry vertical, a technology, a business process and a period adjustment factor.

12. The system of claim 11, wherein the period adjustment factor is indicative of an extended duration for executing the SDLC activity.

13. A non-transitory computer-readable storage medium having instructions that, when executed by a processor, cause the processor to:

obtain information associated with a plurality of configuration parameters of the SDLC activity, wherein the plurality of configuration parameters comprise an organization, an industry vertical within the organization, business criticality of a plurality of functionalities within the industry vertical, a utilization factor and influencing factors of the organization;

determine configuration factors associated with the SDLC activity based on the information associated with at least one of the plurality of configuration parameters, wherein the configuration factors comprise a functionality factor, a volume factor, a base effort factor, and a productivity adjustment factor, wherein the functionality factor is determined based on a score of each of the plurality of functionalities in the SDLC activity and the business criticality of the plurality of functionalities, wherein the score of each of the plurality of functionalities in the SDLC activity is dynamically determined based on the business criticality of the plurality of functionalities, wherein the volume factor is derived based on the score for each of the plurality of functionalities and a complexity score for each of the influencing factors, wherein the base effort factor is determined based on base effort required to implement the plurality of functionalities in person months and wherein the productivity adjustment factor is determined based on the functionality factor, the volume factor, and the base effort factor;

estimate functional effort for configuration of the SDLC activity based on the determined configuration factors;

obtain information associated with a plurality of customization parameters of the SDLC activity, wherein the plurality of customization parameters comprise reports, conversions, extensions, and enhancements and workflows associated with the SDLC activity and wherein the information associated with the plurality of customization parameters comprise a number of each of the plurality of customization parameters and complexity distribution of each of the plurality of customization parameters;

estimate customization effort for customization of the SDLC activity based on the information associated with the plurality of customization parameters;

dynamically derive a size-index from the volume factor; and estimate the package implementation effort of the SDLC activity using the functional effort, the customization effort and the size-index as a multiplier coefficient.

14. The non-transitory computer-readable storage medium of claim 13, wherein the instructions further comprises instructions to:

obtain information associated with project management effort, quality assurance effort and database administration effort of the SDLC activity; and adjust the estimated package implementation effort of the SDLC activity based on at least a part of the information associated with project management effort, quality assurance effort and database administration effort of the SDLC activity.

* * * * *